United States Patent [19]
Bowman

[11] 3,765,856
[45] Oct. 16, 1973

[54] GLASS WARE ASSEMBLING AND LEHR LOADING MECHANISM

[75] Inventor: Edward W. Bowman, Uniontown, Pa.

[73] Assignee: E. W. Bowman Incorporated, Uniontown, Pa.

[22] Filed: Mar. 28, 1972

[21] Appl. No.: 238,919

[52] U.S. Cl......................... 65/60, 65/119, 65/260, 118/315, 118/324, 118/503
[51] Int. Cl............................................. C03b 25/04
[58] Field of Search...................... 65/118, 119, 260, 65/60; 118/324, 315, 503

[56] References Cited
UNITED STATES PATENTS

| | | | |
|---|---|---|---|
| 1,845,839 | 2/1932 | Hoge et al. | 65/260 X |
| 3,424,129 | 1/1969 | Peeps et al. | 118/324 X |
| 78,497 | 6/1868 | Watrous | 118/503 X |
| 1,795,665 | 3/1931 | Miller | 65/260 |

*Primary Examiner*—Arthur D. Kellogg
*Attorney*—William B. Jaspert

[57] ABSTRACT

This disclosure relates to apparatus for assembling glass ware such as bottles in rows, and in spaced relation, as they are delivered from a forming machine, and for loading the bottles on the conveyor belt of a glass annealing lehr without contact with each other.

Glass ware such as bottles are produced at the rate of 60 to 160 (or more) bottles per minute (depending on the number of forming sections) and the production of one or more forming machines is loaded on to the conveyor belt of a single glass annealing lehr.

The bottles are not pushed or dragged on any supporting surface which would cause them to upset and contact one another resulting in damage or breakage. Abrasion is entirely avoided by engaging the finish or neck of the bottles and lifting them from one movable support to another out of contact with each other.

This invention is particularly useful with modern nonabrading glass ware coating process which are applied before and after annealing and which is substantially impaired once the body of the glass ware has impacted one another by contact when upset by pusher mechanism or by the great speed of production which causes the ware to accumulate at a speed greater than the lehr loading mechanism is capable of handling.

By means of the present invention the glass ware is assembled in any desired numbers and loaded on the belt of the annealing lehr at any speed necessary to avoid accumulation and contact.

16 Claims, 14 Drawing Figures

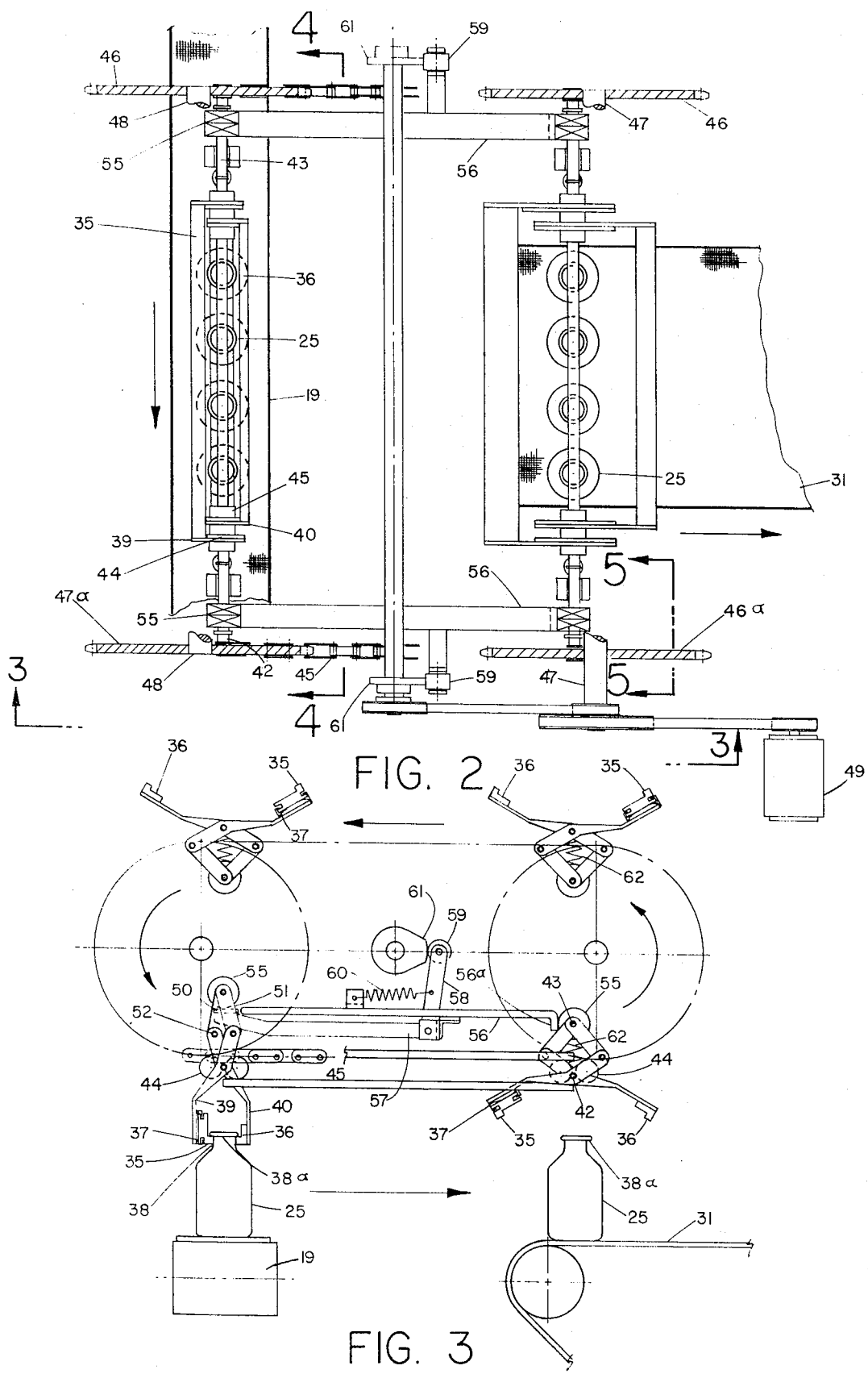

GLASS WARE ASSEMBLING AND LEHR LOADING MECHANISM

BACKGROUND OF THE INVENTION

1. Field of the Invention

Glass ware handling equipment for the prevention of abrasive contact of formed glass ware such as bottles with each other and with their moving supports in their transfer from the forming machine to the annealing lehr conveyor and throughout the glass annealing cycle.

2. Description of the Prior Art

Glass ware such as bottles have been produced by modern forming machines for many years, at least three decades, and stacks and unscramblers of many designs and functions have been proposed. A method presently in common use of loading the bottles onto the conveyor belt of a glass annealing lehr is to assemble and move the bottles in rows in front of and across the charging end of a lehr belt and then push a row of bottles from the assembly conveyor onto the charging end of the lehr conveyor by what is known as a pusher bar. The bottles get out of line and frequently some of the bottles in a row upset and cause bottles in front of the row to upset on the lehr conveyor. Machine operators are in constant attendance to unscramble and remove the bottles when they upset.

SUMMARY OF THE INVENTION

The herein disclosed glass ware handling and transfer mechanism increases the speed of flow of glass ware from the forming machine to the lehr and thereby increases the capacity of the forming and annealing equipment in a given space.

Accordingly, the principal object of this invention is to provide apparatus for engaging a row of glass ware such as bottles by the finish or neck and lift them from their support, move them above the charging end of a lehr conveyor belt, lower them on said belt and release them when in contact with the said belt without abrasive contact of the ware with each other or with their supports.

Another object of this invention is to synchronize the movement of the above referred to transfer device with the movement of the bottles leaving the forming machine and the movement of the lehr conveyor belt to avoid abrasion by contact of the ware with any relatively moving parts.

A still further object of the invention is to provide transfer apparatus operative to transfer a predetermined number of bottles to occupy a transverse dimension of a given width of lehr conveyor belt in single or multiple rows.

These and other objects of this invention will be more completely disclosed and described in the following specification, the accompanying drawings and claims.

BRIEF DESCRIPTION OF THE DRAWINGS

FIG. 2 a top plan view of the transfer mechanism embodying this invention;

FIG. 3 an end elevation taken along the line 3—3 of FIG. 2;

In FIG. 1 of the drawings the transfer mechanisms are diagrammatically shown in relation to the ware forming machine 10, annealing lehr 20, and feed and cross conveyors 15 and 19 respectively. Numeral 17 is a transfer mechanism for lifting the ware which in this case are illustrated as bottles 25 from feed conveyor 15 to cross conveyor 19. Transfer mechanism generally designated at 30 transfers the ware from conveyor 19 to lehr conveyor 31. Transfer mechanism which is identical to transfer mechanism 30 transfers bottles 25 after they are annealed in lehr 20 from conveyor 31 to an inspection table consisting of conveyor belts 31a. A fan blower 20a is provided for controlling the temperature of the individual lehr zones shown in reduced sections in FIG. 1. The flow of the ware is shown by arrows.

With reference to FIGS. 2 and 3 of the drawings, the transfer mechanisms 30 and 30a consists of a pair of clamping bars 35 and 36, with bar 35 having a spring mounting 37 by which bar 35 yieldingly engages the neck or finish 38 of bottles 25 on conveyor 19, FIG. 3. Bars 35 and 36 are constructed of a non-marring heat resisting material and they are attached to levers 39 and 40 mounted on shafts 42 and 43 connected by links 44 to sprocket chains 45 and 46. Sprocket chains 45 and 46 are mounted on sprocket wheels 46a and 47a driven by motor 49, all as shown in FIG. 2, 4 and 5.

Figure 4:
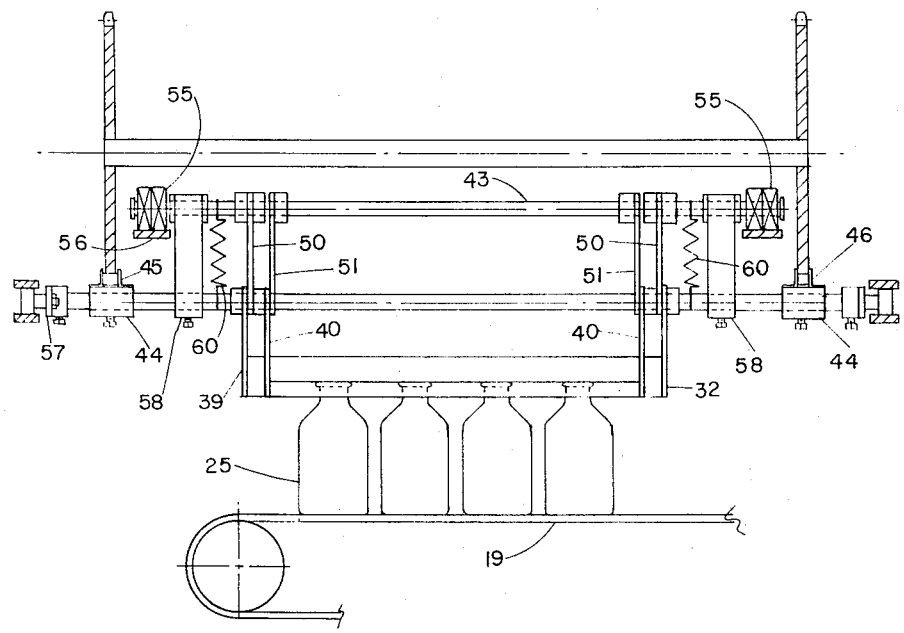
FIG. 4 a side elevation taken along the line 4—4 of FIG. 2.
Figure 5:
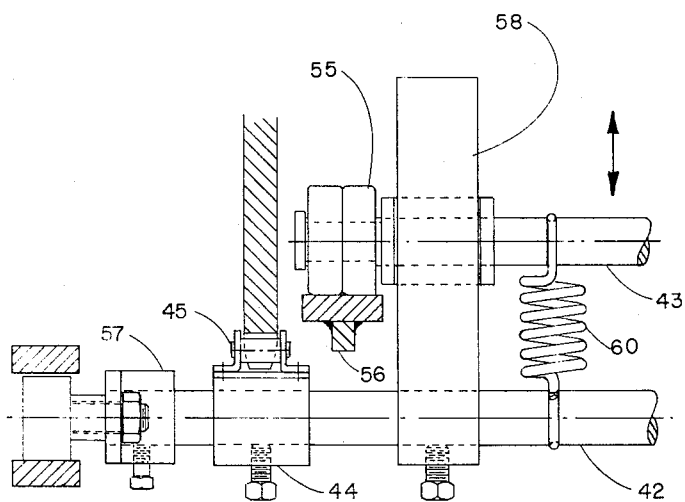
FIG. 5 a partial side elevational view taken along the line 5—5 of FIG. 2.

Links 50 and 51 are pivoted to shaft 43, FIG. 4, and levers 39 and 40 are pivotally mounted on shaft 42 and pivotally connected at their inner ends to the links 50 and 51. Rollers 55 are mounted on the ends of shafts 43 and are engaged by a horizontal track 56 which is fixed against movement and which the rollers traverse from left to right as viewed in FIG. 3. Lifting arm 57 engages the rollers 55. Arm 57 is actuated by lever 58, having a cam follower 59, that is biased by spring 60 to engage cam 61. Arm 57 is raised by the cam 61 and lifts the rollers 55 to ride on track 56 which causes the closure of gripping bars 35 and 36 to engage the finish of bottles 25, and when the rollers 55 ride off the track 56 at the lip 56a as shown in FIG. 3 the levers 39 and 40 which are biased to open position by springs 60 will open and release the ware on the charging end of the lehr conveyor 31. The open clamping bars will move back to conveyor 19 to engage a new row of bottles.

While the clamping bars 35 and 36 are shown to be of a length to accommodate four bottles, it is evident that bars of a length to receive and engage more or less bottles may be used and more than one set of clamping bars may be aligned in tandem and operated simultaneously to accommodate the accumulation of any rate of production of the forming machines.

A bead 38a is shown as the top of the finish but in most instances the bead is at the bottom of the thread of the finish but either design is suitable for the transfer mechanism of FIGS. 2 and 3 because the clamping bars are designed to lift the bottles by the bead 38a with a light gripping pressure of clamping bars 35 and 36 imposed by spring 37. Protuberances well known in the art may be used for lifting the ware where no rings or outside finish has been formed on the ware.

Figure 11:
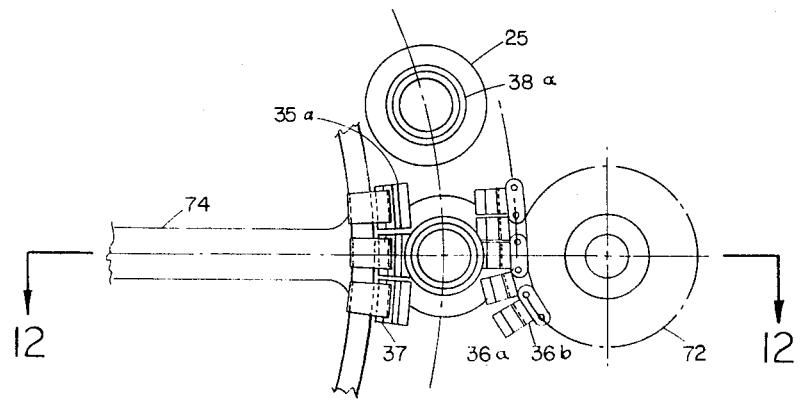
FIG. 11 a top plan view of a bottle gripping device shown in FIG. 6 to 10.
Figure 12:
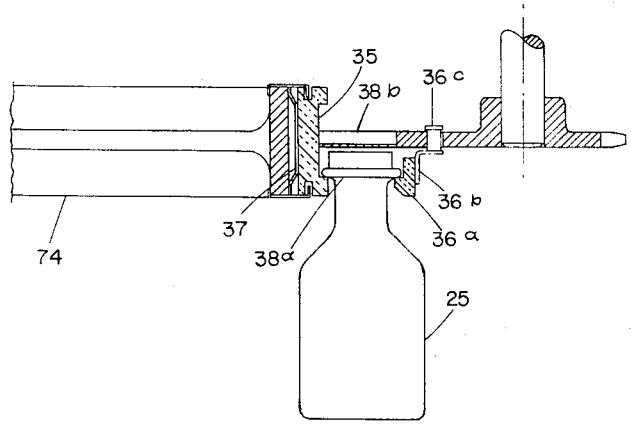
FIG. 12 a side elevation partially in section taken along the line 12—12 of FIG. 11.

The construction of the gripping means of clamping bars 35 and 36 and their gripping engagement is more clearly shown in FIGS. 11 and 12 of the drawings. The gripping jaws 35a and 36a are mounted on a sprocket chain and turntable of the transfer device 17 of FIGS. 1, 13 and 14 and on the parallel sprocket chains of FIGS. 6 to 8 inclusive. The transfer bars 35 and 36 of FIGS. 1 to 4 have bottle engaging gripping jaws of the same cross-sectional shape as the jaws of FIG. 12. The gripping elements 35 and 35a have a channel shaped face for engaging the bottle finish, the element 35 being mounted on spring 37 to assert a yieldingly gripping action on the bead of the bottle. The gripping element 36a is mounted on a special link 36b of a sprocket chain 36c which is endless and travels on sprocket wheels 70, 71 and 72, the latter being driven by motor 73.

Figure 13:
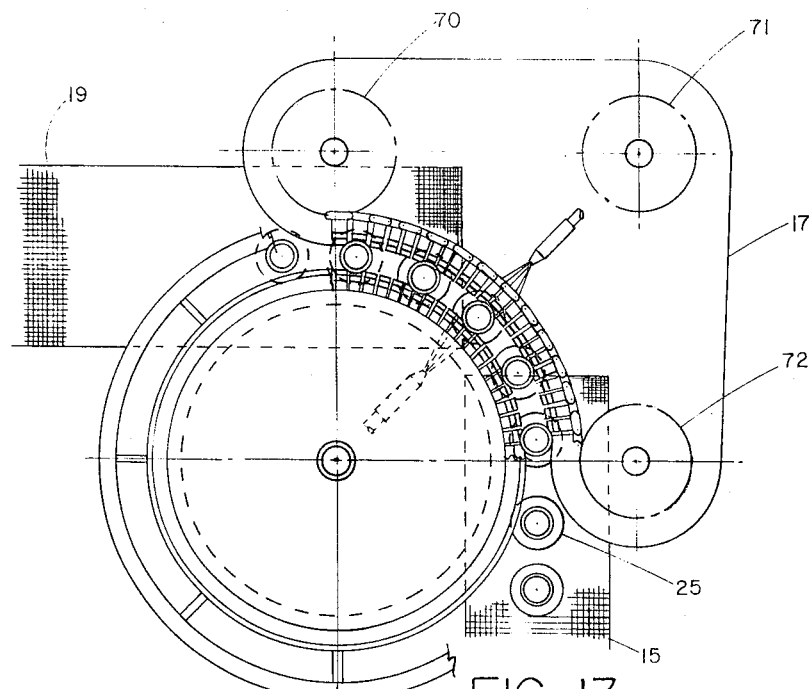
FIG. 13 a top plan view diagrammatically illustrating a transfer mechanism.
Figure 14:
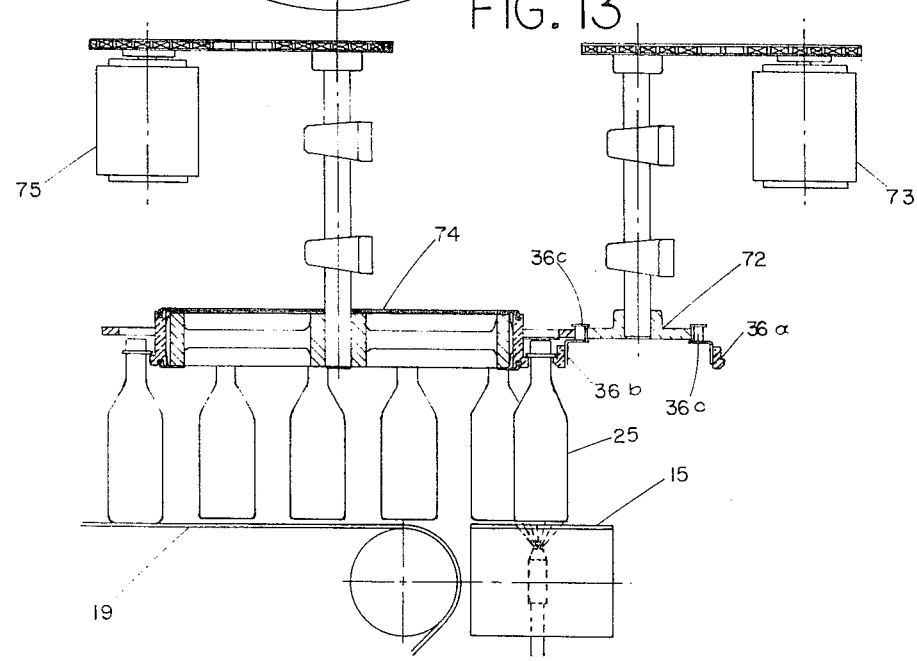
FIG. 14 a side elevation of FIG. 13.

The gripping elements 35a, FIGS. 11 to 14, are mounted on springs 37 attached to wheel 74 that is driven by motor 75. The speed motors 73 and 75 may be adjusted to synchronize the peripheral speed of gripping elements 35a and 36a whereby abrasive contact with the bottles 25 is avoided. Likewise the speed of conveyor belts 15 and 19, FIGS. 13 and 14, are synchronized to travel at the same speed as the bottles being transferred to avoid abrasive contact of the bottles 25 with their supports.

Figure 9:
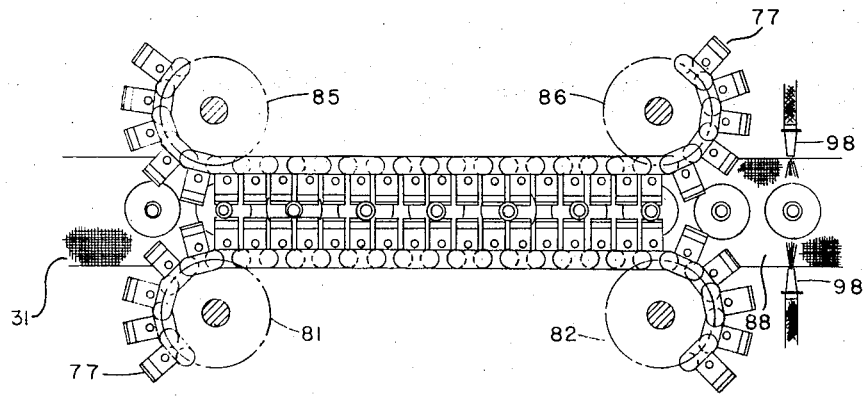
FIG. 9 a top plan view of a modified form of belt to belt transfer mechanism.
Figure 10:
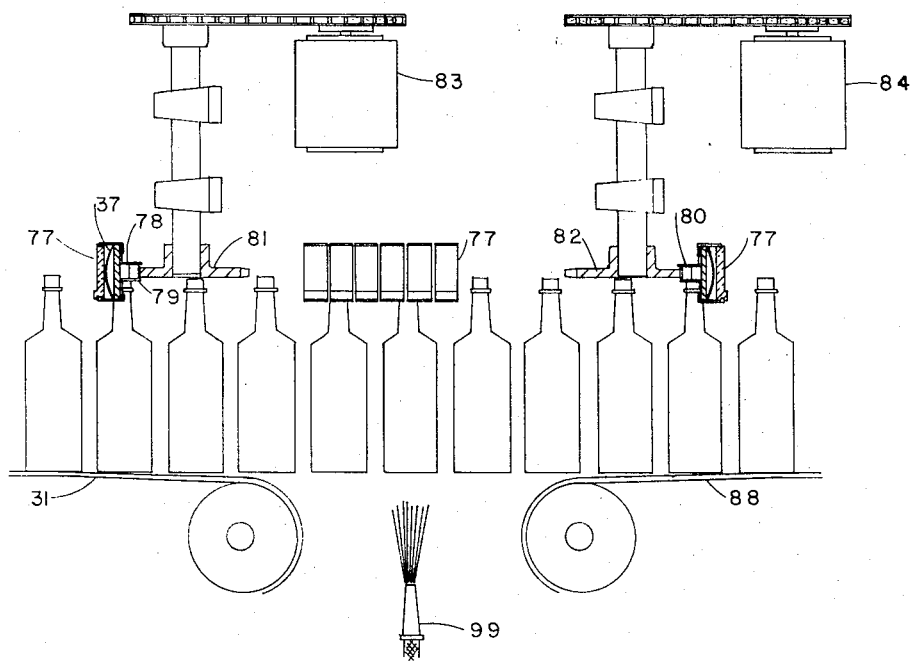
FIG. 10 a side elevation of FIG. 9.

Referring to FIGS. 9 and 10, the gripping elements 77 are mounted on backing springs 37 which are attached to links 78 of sprocket chains 79 and 80 that are mounted on sprocket wheels 81 and 82 driven by motors 83 and 84 around idler wheels 85 and 86. Motors 83 and 84 are operated at the same speed. It will be noted in FIG. 10 that the transfer mechanism bridges conveyor belts 31 and 88 that are driven by motors 89 and 90, FIG. 1, to synchronize the speed of the conveyors with the movement of bottles 25 by motors 73 and 75.

Figure 6:
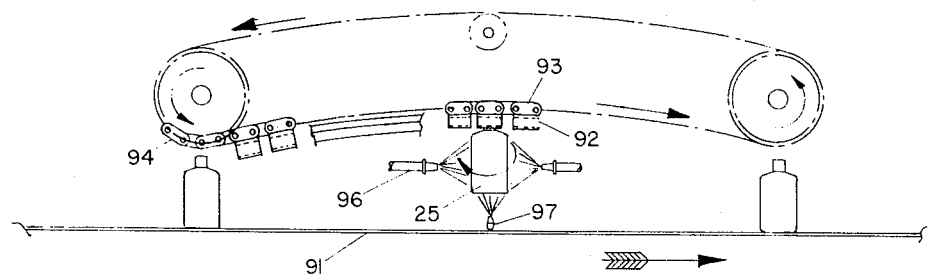
FIG. 6 a side elevation of a bridge type transfer mechanism for lifting the bottles from their conveyor for spraying.
Figure 7:
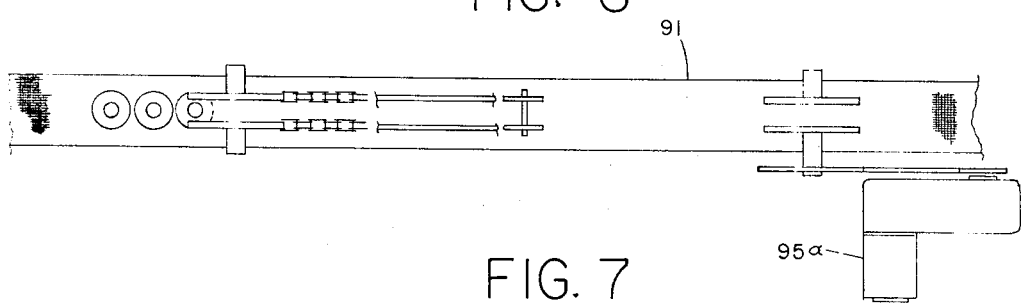
FIG. 7 a top plan view diagrammatically illustrating the travel of the transfer mechanism of FIG. 6.
Figure 8:
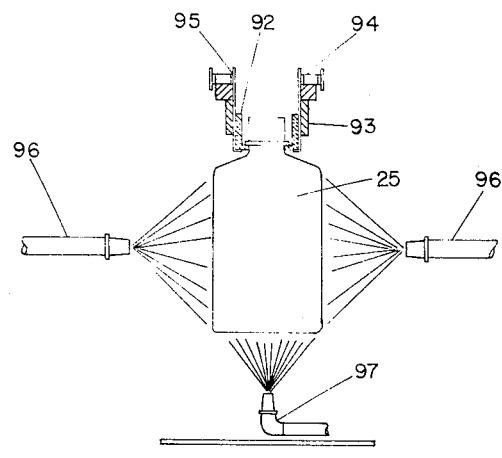
FIG. 8 a side view diagrammatically illustrating a bottle and side and bottom sprays.

Another form of transfer mechanism which can be utilized to bridge the gap between two conveyor belts of the type shown in FIG. 10 or to lift the bottles from a belt 91 for spraying and set it down again on the same belt, is shown in FIGS. 6 to 8. In FIG. 6 the gripping elements 92 are mounted on special links 93 of sprocket chains 94 and 95 driven by motor 95a, FIG. 7. Side and bottom spray heads 96 and 97 are provided as shown in FIG. 8, and side and bottom spray heads 98 and 99 are shown in FIGS. 9 and 10 respectively. A bottle transfer mechanism as shown in FIG. 6 may be utilized for spraying anywhere on any conveyor.

From the foregoing description of the invention it is evident that glass ware such as bottles can be manipulated from the forming machine to the inspection and packing table without abrasive contact with each other and with their moveable supports. The engagement of the gripping elements of the transfer mechanism with a shoulder or protuberence on the ware to lift it from its moveable support and space it uniformly in single or multiple rows on conveyor mechanism passing to, through and from a lehr to spray or decorate the ware brings the glass ware forming and treating operation to a single compact area.

Figure 1:
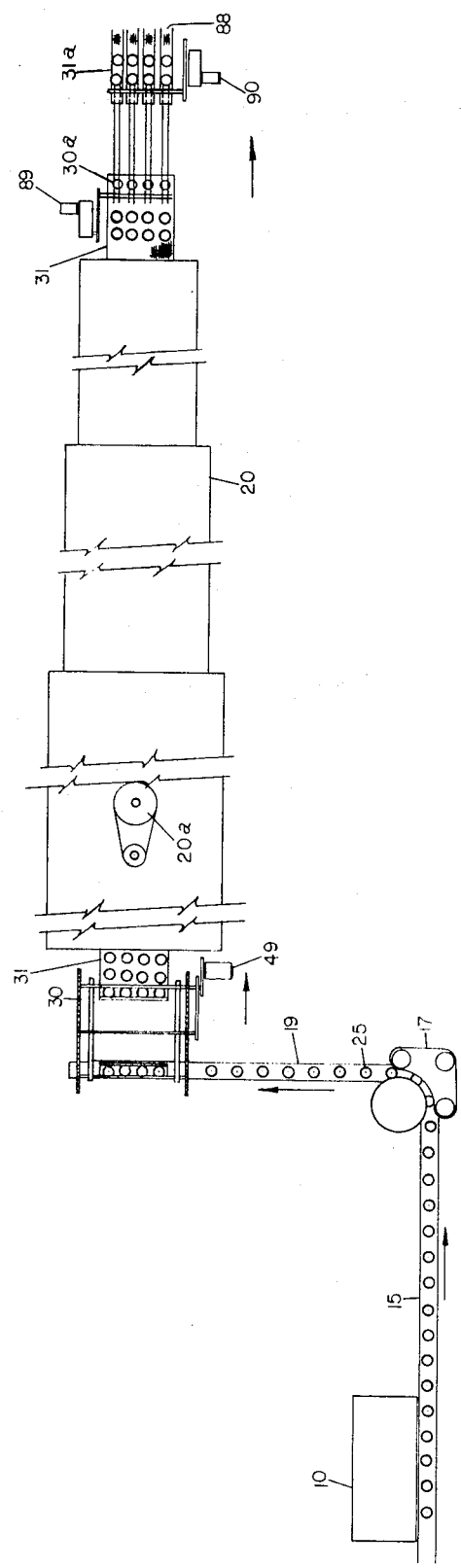
FIG. 1 is a plan view diagrammatically illustrating a bottle forming machine and a glass annealing lehr with spraying stations, feed conveyors, and the transfer apparatus of this invention.

It has been shown that the ware may be sprayed on the bottom and/or sides at transfer station 17, FIG. 1. Also, the bottom and/or sides may be coated at transfer station 30, FIG. 1, thus giving it two coats of non-abrasive or lubricating material before entering the annealing lehr.

At the end of the glass annealing period the glass is again sprayed at a reduced temperature of between 30° and 180° before it is handled or packed. The transfer mechanism of FIG. 6 may be employed even inside the lehr 20 for non-abrasive spraying or for decorating purpose at selected temperature zones of the lehr. The bottles may be capped by covers 38b, FIG. 12, to prevent contamination by the sprayed coating entering inside the bottle.

According to the provisions of the patent statute, the principles and mode of operation of the invention have been explained, illustrated and described, and it is evident to those skilled in the art that modifications may be made in the details of construction without departing from the principles herein set forth.

I claim:

1. In the method of treating glass ware from a glass forming machine to and through a glass annealing lehr, comprising the steps of depositing the newly formed ware uniformly spaced in a single row on a transfer conveyor for conveying the ware to a transfer mechanism at the charging end of a lehr conveyor which passes through said annealing lehr, said transfer conveyor traveling across the charging end of said lehr conveyor substantially at right angles thereto, simultaneously engaging and suspending a group of ware proportional to the width of said lehr conveyor from said single row of ware on said transfer conveyor and depositing said group on said lehr conveyor at the charging end thereof at the speed of movement of said lehr conveyor, and further including the step of spraying at least the sides of said ware before passing through said annealing lehr and while said ware are suspended from their conveyor support.

2. The method of treating glass ware set forth in claim 1 wherein said transfer conveyor includes a first section on which the ware are deposited from said forming machine and a second section traveling at the same speed as and at right angles to said first section, and further including the steps of transferring said ware from said first section to said second section by suspending the ware from their conveyor support and transferring the same at the same speed to said second section, and spraying the sides and bottom of said ware while in said suspended position between said first and second sections.

3. The method of spraying glass ware as set forth in claim 1 further including the steps of lifting the ware from a conveyor surface, spraying the sides and bottom of the ware, and depositing the sprayed ware on the same conveyor.

4. The method of claim 1 further including the step of spraying the sides and bottom of said ware subsequent to the passage of said ware through said annealing lehr.

5. In the method of treating glass ware from a glass forming machine to and through a glass annealing lehr, comprising the steps of depositing the newly formed ware uniformly spaced in a single row on a transfer conveyor, said transfer conveyor including a first section for receiving newly formed ware from said forming machine and a second section spaced from and at right angles to said first section for conveying the ware to a transfer mechanism at the charging end of a lehr conveyor which passes through said annealing lehr, said second section traveling across the charging end of said lehr conveyor substantially at right angles thereto, suspending said ware from conveyor support while transferring said ware from said first to said second conveyor sections, spraying at least the sides of said ware while suspended between said first and second sections, and thereafter simultaneously engaging and suspending a group of ware proportional to the width of said lehr conveyor from said single row of ware on said second section of said transfer conveyor and depositing said group on said lehr conveyor at the charging end thereof at the speed of movement of said lehr conveyor.

6. In a glass ware annealing system, the combination including a forming machine, an annealing lehr, transfer conveyor means for maintaining a continuous flow of newly formed ware in a single row from the forming machine to the annealing lehr, a lehr conveyor extending through said annealing lehr and having a charging end spaced from and at right angles to said transfer conveyor means at the inlet end of said lehr, transfer mechanism for simultaneously engaging and suspending a group of ware proportional to the width of said lehr conveyor from said single row on said transfer conveyor means and depositing the same on said lehr conveyor, said transfer mechanism moving at the same speed as said lehr conveyor, and means in advance of said lehr conveyor for spraying at least the sides of said ware prior to passing through said annealing lehr.

7. The glass ware annealing system of claim 6 wherein said transfer mechanism includes gripping elements for engaging and suspending the group of ware from said transfer conveyor means and releasing said ware onto said lehr conveyor, said gripping elements being mounted on sprocket chains and having jaws the engaging portions of which are substantially L-shape to engage protuberances on the ware to support the ware thereon, one of said jaws being mounted on a spring to grippingly engage the ware.

8. The glass ware annealing system of claim 7 in which the glass ware are bottles and the L-shape gripping jaws engage the outer bead of the finish on the neck of the bottle and the jaws engage the neck only, leaving the sides and bottom of the bottles exposed for spraying when in their suspended position.

9. The glass ware annealing system of claim 7 in which the gripping elements are bars engaging groups of bottles the number of which are determined by the spacing of the bottles in front of the lehr conveyor and the length of the gripping bars.

10. The glass ware annealing system of claim 7 further including cam rollers operatively connected to said gripping elements, means for resiliently biasing said gripping elements to their open position, and a cam track between said transfer conveyor means and said lehr conveyor in the path of said cam rollers, said cam rollers first engaging said cam track for moving said gripping elements to their closed position for suspending the ware, and thereafter falling off said cam track when said ware overlies said lehr conveyor to permit said gripping elements to open under the force of said biasing means thereby releasing the ware onto said lehr conveyor.

11. The glass ware annealing system of claim 10 further including means for synchronizing the speed of said transfer conveyor means, said sprocket chains carrying said gripping elements and said cam rollers, and said lehr conveyor whereby said ware can be transferred as a group at a continuous, preselected speed from said transfer conveyor means to said lehr conveyor.

12. The glass ware annealing system of claim 6 wherein said spraying means is located adjacent said transfer mechanism.

13. The glass ware annealing system of claim 6 wherein said transfer conveyor means includes a first section on which the ware are deposited from said forming machine and a second section traveling at the same speed as and at right angles to said first section, and transfer means between said first and second sections and traveling at the same speed for transferring said ware from said first section to said second section.

14. The glass ware annealing system of claim 13 wherein said spraying means is mounted adjacent said transfer means between said first and second sections of said tranfer conveyor means.

15. The glass ware annealing system of claim 14 wherein said spraying means further includes additional spray heads located adjacent said transfer mechanism.

16. The glass ware annealing system of claim 6 further including ware suspending means disposed above any one or both of said transfer conveyor means and said lehr conveyor for elevating said ware above said conveyor support, and spray means associated with said suspension means for apraying the sides and bottom of said ware when in said suspended position.

* * * * *